Feb. 6, 1962 M. R. PETERSON 3,019,801
WINDOW WASHING SYSTEM
Filed Sept. 4, 1959 2 Sheets-Sheet 1
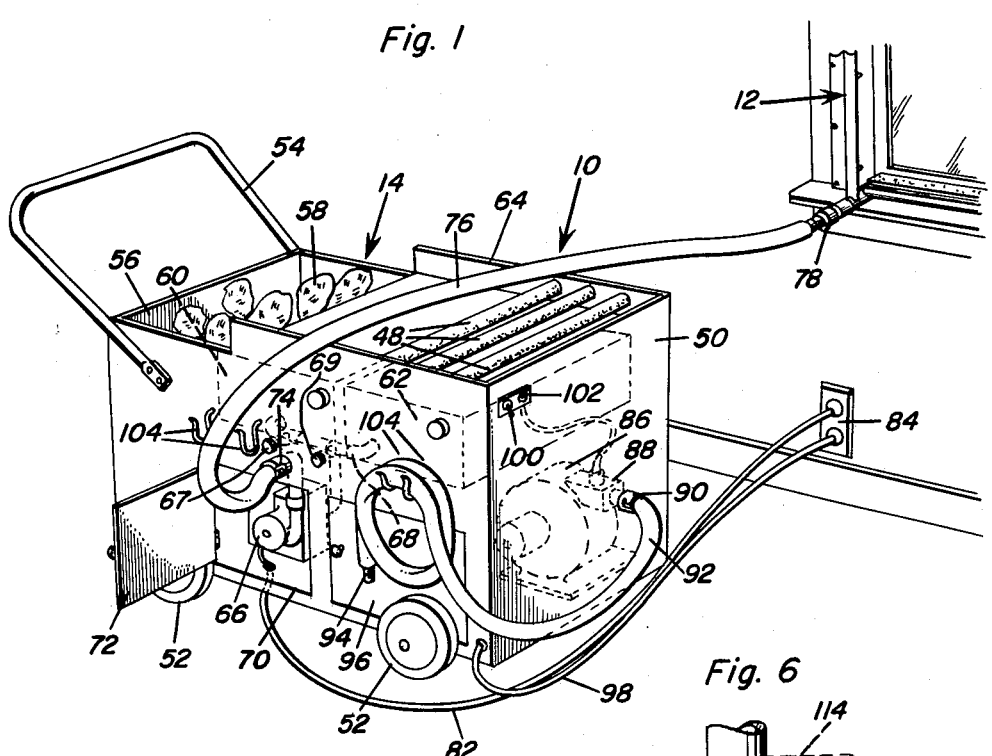
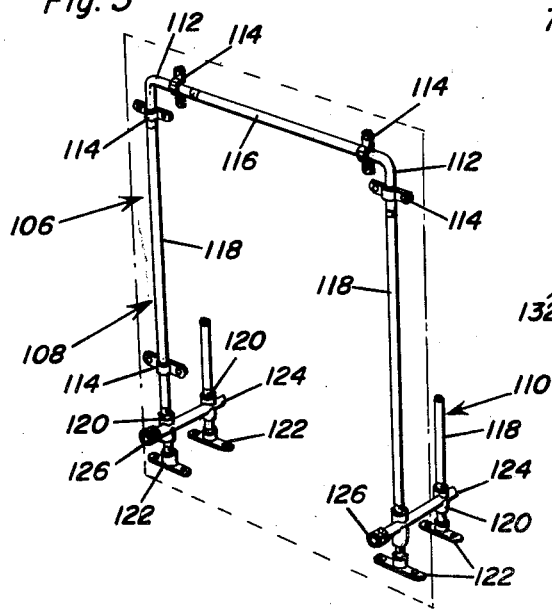
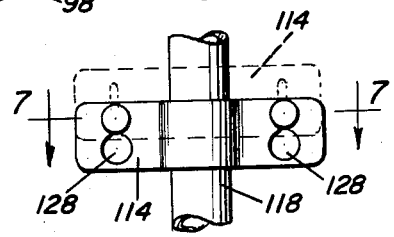
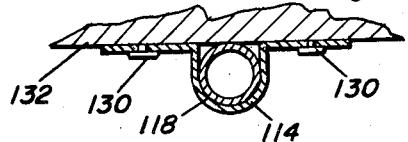
Marian Ruth Peterson
INVENTOR.

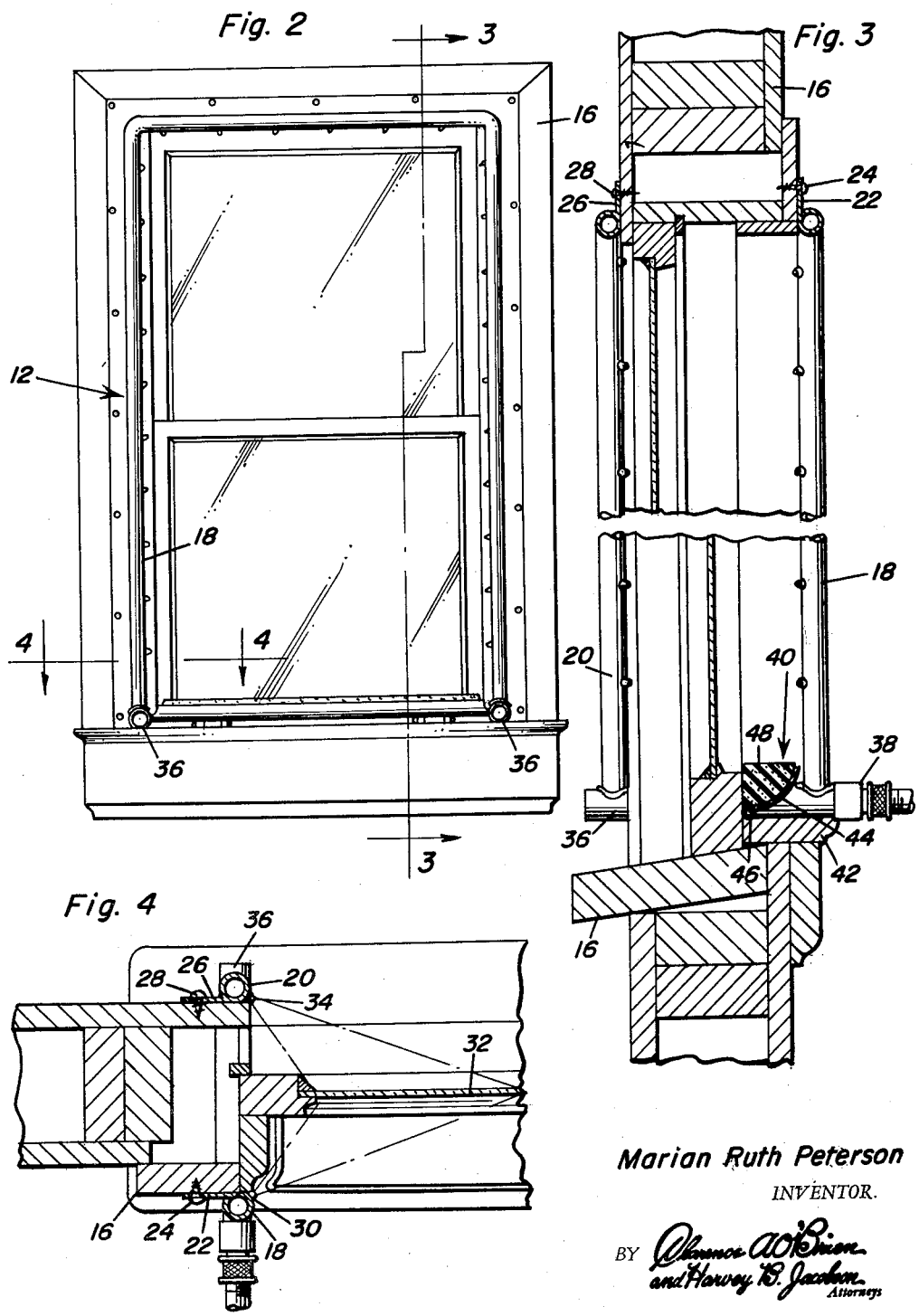

United States Patent Office 3,019,801
Patented Feb. 6, 1962

3,019,801
WINDOW WASHING SYSTEM
Marian Ruth Peterson, 1145 E. 5th St., Reno, Nev.
Filed Sept. 4, 1959, Ser. No. 838,132
5 Claims. (Cl. 134—94)

This invention relates in general to new and useful improvements in window cleaning equipment, and more specifically to a novel window washing system.

The primary object of the invention is to provide equipment which may be provided on the exterior or interior of a window for directing cleansing spray towards the individual panes of the window, and there being other equipment which is portable and which may be connected to the equipment provided on the window for selectively dispensing against the window cleaning liquid and air, whereby the window may be first washed and subsequently dried.

A further object of the invention is to provide a novel window washing system which includes spray frames which are mounted on the window frame around the individual sashes, the spray frames having a plurality of nozzles directed towards the sashes whereby when cleaning fluids are forced into the spray frames, the cleaning fluid will be directed onto the sashes for the purpose of cleaning the individual windows.

Another object of the invention is to provide a window washing system which includes spray frames mounted on the exterior and interior of the window for simultaneously directing cleaning fluids against the opposite surfaces of the window, and there being provided a portable cart which includes cleansing liquid and means for providing hot air, the portable cart having suitable fittings for attaching to the spray frames for selectively directing against the windows the cleansing liquid and the drying air.

A further object of the invention is to provide a novel apparatus for use in cleaning windows, the apparatus being in the form of removable spray frames which are removably mounted on the interior and exterior surface of a window frame, and there being transverse connections between the spray frames which extend through the window frame opening and temporarily couple the two spray frames together.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the general details of the portable portion of the present invention and shows the same attached to a portion of the spray frame assembly which is mounted on the window;

FIGURE 2 is an elevational view of the window of FIGURE 1 and shows the general arrangement of the spray frame mounted thereon;

FIGURE 3 is an enlarged vertical sectional view taken substantially upon the plane indicated by the section line 3—3 of FIGURE 2 and shows the specific application of the spray frame structure to the window, an intermediate portion of the window being broken away;

FIGURE 4 is an enlarged fragmentary horizontal sectional view taken substantially upon the plane indicated by the section line 4—4 of FIGURE 2 and shows the inner and outer mounting of the spray frames and the manner in which they direct cleaning fluids against the panes of the windows;

FIGURE 5 is a perspective view of a removable form of spray frame assembly;

FIGURE 6 is an enlarged fragmentary elevational view showing the manner in which one of the removable spray frames is removably secured to a window frame; and FIGURE 7 is an enlarged fragmentary horizontal sectional view taken substantially upon the plane indicated by the section line 7—7 and FIGURE 6 and shows further the details of the removable mounting of the spray frame.

Referring now to the drawings in detail, it will be seen that there are illustrated in FIGURE 1 the components of the window washing system, which is the subject of this invention, the window washing system being generally referred to by the reference numeral 10. The window washing system 10 includes a spray frame assembly, generally referred to by the numeral 12, which is mounted on the individual window, and a portable cleaning unit, which may be wheeled from window to window, the portable cleaning unit being referred to in general by the reference numeral 14.

Reference is now had to FIGURES 2, 3 and 4 in particular wherein a conventional double-hung window 16 is illustrated. The spray frame assembly 12 includes an inner inverted U-shaped spray frame 18 and an outer inverted U-shaped spray frame 20. The spray frame 18 is secured to the frame of the window 16 by integral straps 22 which are secured to the frame of window 16 by suitable fasteners 24. The spray frame 20 is of identical construction as spray frame 18 and is provided with suitable straps 26 which are secured to the inner frame in the window 16 by fasteners 28.

The spray frame 18 is provided with a plurality of nozzles 30 which are outwardly directed and converge generally toward each other so as to spray cleansing fluid onto the individual panes 32 of the window 16. Also, the spray frame 20 is provided with individual nozzles 34 which are inwardly directed and which converge toward each other to direct cleansing fluid onto the outer surfaces of the frames 32. This is best illustrated in FIGURE 4.

The lower ends of the spray frames 18 and 20 are connected together by transverse tubes 36. The tubes 36, in a permanent installation, will pass through the frame of the window 16. Each of the tubes 36 is provided on the room end thereof with a suitable fitting 38 to facilitate the connection of a hose. Incidentally, when a hose is connected to one of the tubes 36, the other of the tubes 36 will, of course, be closed.

In order to collect the cleansing liquid which will run down the inner surface of the window 16, a liquid collector, generally referred to by the numeral 40, is mounted on the inner sill 42 of the window 16. The liquid collector 40 includes a generally channel-shaped receptacle 44 which is hingedly mounted on the window sill 42 as at 46. An elongated sponge 48 is seated in the receptacle 44 for collecting the cleansing liquid. The receptacle 44 swings in a clockwise direction, as viewed in FIGURE 3, to permit the releasing of the sponge 48 and the removal thereof. In lieu of hingedly mounting the receptacle 44, the receptacle may be releasably hooked to the tubes.

Reference is now had to FIGURE 1 in particular wherein the details of the portable unit 14 are shown. The portable unit 14 is in the form of a cart 50 which is supported by wheels 52. The cart 50 also is provided with a push-type handle 54 at one end thereof. A generally triangular compartment 56 is formed at the rear of the cart 50 for the reception of sponges 58, as well as the sponges 48. A pair of tanks 60 and 62 are mounted in the upper part of the cart 50. The tank 60 will carry a detergent and the tank 62 will carry fresh water.

An elongated tray 64 directly overlies the tanks 60 and 62. It will be seen that the sponges 48 are stored therein. The sponges 48 will be primarily stored in the tray 64, although the wet sponges, if necessary, may be stored in the receptacle 56.

A pump 66 underlies the tank 60 and is connected to the tanks 60 and 62 by a piping unit 68 for selectively receiving liquid from either the tanks 60 or 62 by manual control of knobs 67 and 69. Access to the pump 66 is gained through an opening 70 inside of the cart 50, the opening being closed by a door 72. The pump 66 also includes an outlet 74 to which a hose 76 is removably connected. The hose 76 has a fitting 78 on the opposite end thereof which is complemental to the fitting 38 so that the hose 76 may be connected to the spray frame assembly 12. In this manner either the detergent liquid or clear water may be pumped into the spray frame assembly 12 and sprayed onto the window frame 32. The pump 66 is driven by an electric motor which has an outlet cord 82 which may be plugged into a conventional wall outlet such as the outlet 84.

In a window washing operation, the sponges 58 are intended for the purpose of removing any excess liquid run-off from the area of the panes 32. The sponges, of course, could be eliminated by providing a return flow line from the receptacle 44 and using the compartment as a waste receptacle.

After the window panes have been washed, it is necessary that they be dried. This is accomplished through a blower 86 and a heater 88 which are mounted in the cart 50 beneath the tank 62. The blower 86 has an outlet fitting 90 to which the hose 92 is removably connected. The opposite end of the hose 92 is provided with a fitting 94 which is identical to the fitting 78 and which may be connected to the spray frame assembly 12. Access to the blower 86 is obtained through a door 96 in the side of the cart 50.

When one of the transverse tubes 36 is being utilized as an inlet, the other must be closed. This can be accomplished either by means of removable caps or check valves.

The blower 86 is driven by an electric motor and the heater 88 is of the electrical type. These are provided with an outlet cord 98 which may also be connected to the outlet 84. Individual operation of the blower 86 and the heater 88 is controlled by a pair of switches 100 and 102. A series of hooks 104 are mounted on the side of the cart 50. The hooks 104 are used for the purpose of supporting the hoses 76 and 92.

Reference is now made to FIGURES 5, 6 and 7 wherein there are illustrated the details of a removable spray frame assembly, which is generally referred to by the numeral 106. The spray frame 106 includes an inner spray frame 108 and an outer spray frame 110. Each of the inner and outer spray frames 108 and 110 include a pair of upper corner fittings 112 which will be releasably secured to a window frame by a pair of straps 114, the details of which will be described hereinafter. A horizontal spray tube 116 extends between the corner fittings 112. Vertical spray tubes 118 are also connected to the fittings 112, and depend therefrom. The lower ends of the vertical spray tubes 118 have fittings 120 connected thereto. Supporting head 122 which may be mounted on the window sills of a window are connected to the lower ends of the fittings 120. Straps 114 are carried by lower portions of the vertical spray tubes 118, and elsewhere as required.

The fittings 120 are of a construction to receive a transverse tube 124. The transverse tube 124 is normally separate from the fittings 120 and snapped in place thereinto, thus the spray frames 108 and 110 may be mounted on a window with the window closed. When it is desired to clean the window, it is necessary to raise the lower sash, after which the transverse tube 124 are positioned in the lower corners of the window opening. The sash is then moved downwardly to a substantially closed position, the tubes 124 will be relatively small and occupying only a small space in the corners of the window opening. The transverse tubes 124 are provided with fittings 126 for attachment of the portable washing unit 14.

Reference is now made to FIGURES 6 and 7 wherein the details of the straps 114 are shown. It will be apparent that the straps 114 are of a conventional cross-section for engaging a pipe, as is best shown in FIGURE 7. The straps 114 differ from conventional straps of the same type only in that they are provided with keyhole slots 128. The straps 114 are retained in place by headed fasteners 130, the heads of which pass through the enlarged portions of the keyhole slots 128, but will not pass through the narrow portions of the same slots. In this manner the straps 114 may be removed from a window frame, such as the window frame 132 by merely moving the straps 114 vertically, as shown in dotted line position of the strap 114 to FIGURE 6, after which the strap 114 is free to move away from the window 132. Thus by leaving the fastener 130 in place, the spray frame assembly 106 may be rapidly installed and removed from a window.

From the foregoing, it will be readily apparent that there has been devised a novel and highly desirable window washing apparatus which, when mounted on a window, will readily facilitate the washing of the window with a minimum of dripping of water into the adjoining room. Thus the window washing system of this invention not only facilitates the washing of the windows, but also aids in the cleanliness of the washing operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A window washing system comprising a generally U-shaped spray frame, means connected to said spray frame for mounting said spray frame on a window in an inverted position, said spray frame having a plurality of nozzles for directing fluids from said spray frame onto a window, means connected to said spray frame for supplying cleaning fluid thereto, and means at the base of said spray frame for collecting spray fluid applied to a window, said spray fluid collecting means including a generally channel-shaped holder and a sponge insert, said holder being hingedly mounted for swinging to an inoperative position for replacement of the sponge insert.

2. The combination of claim 1 including means connected to said spray frame for supplying cleaning fluid thereto, said means being in the form of a portable cleaning unit which may be wheeled from window to window.

3. The system of claim 2 wherein said cleaning unit includes a cleaning liquid supply tank, a pump and a hot air blower.

4. A window washing system comprising, a spray frame, means connected to said spray frame for mounting on a window, said spray frame having a plurality of apertures directing fluids from the spray frame onto the window, fluid supply means connected to the spray frame for supplying cleaning fluid thereto, collecting means mounted adjacent a lower end of the spray frame for collecting spray fluid applied to the window including a fluid collecting holder movably mounted for movement between a fluid collecting position and a replacement position and a fluid absorbing insert removably mounted in the holder for replacement when the holder is in said replacement position.

5. The combination of claim 4 wherein said fluid supply means comprises a portable cleaning unit removably connected to said spray frame.

References Cited in the file of this patent

UNITED STATES PATENTS

| | | |
|---|---|---|
| 1,200,289 | Wittemann | Oct. 3, 1916 |
| 1,842,099 | Johnson | Jan. 19, 1932 |
| 2,465,562 | Hopper | Mar. 29, 1949 |
| 2,633,437 | Detjen | Mar. 31, 1953 |
| 2,699,792 | Fisher | Jan. 18, 1955 |
| 2,751,915 | Roberts | June 26, 1956 |
| 2,754,834 | Merancy | July 17, 1956 |